United States Patent
Rodriguez Bravo

(10) Patent No.: US 11,853,173 B1
(45) Date of Patent: Dec. 26, 2023

(54) LOG FILE MANIPULATION DETECTION

(71) Applicant: Kyndryl, Inc., New York, NY (US)

(72) Inventor: Cesar Rodriguez Bravo, Alajuela (CR)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 18/186,506

(22) Filed: Mar. 20, 2023

(51) Int. Cl.
*G06F 15/16* (2006.01)
*G06F 11/16* (2006.01)
*G06F 11/34* (2006.01)

(52) U.S. Cl.
CPC ...... *G06F 11/1629* (2013.01); *G06F 11/3409* (2013.01); *G06F 2201/81* (2013.01)

(58) Field of Classification Search
CPC ............. G06F 11/1629; G06F 11/3409; G06F 2201/81
USPC .......................................................... 709/223
See application file for complete search history.

(56) References Cited

U.S. PATENT DOCUMENTS

| | | | | |
|---|---|---|---|---|
| 7,185,366 B2* | 2/2007 | Mukai | ................. | H04L 63/1425 713/153 |
| 7,664,740 B2* | 2/2010 | Starbuck | ............. | G06F 16/3326 707/706 |
| 8,060,455 B2* | 11/2011 | Liu | ................... | G06F 16/24578 706/20 |
| 8,676,830 B2* | 3/2014 | Mukherjee | .......... | G06F 16/9532 707/768 |
| 8,887,286 B2 | 11/2014 | Dupont et al. | | |
| 9,185,125 B2 | 11/2015 | Varsanyi et al. | | |
| 9,208,335 B2 | 12/2015 | Wu et al. | | |
| 10,061,816 B2* | 8/2018 | Convertino | ....... | G06F 16/24573 |
| 10,715,552 B2 | 7/2020 | Tsironis | | |
| 10,756,949 B2* | 8/2020 | Kulshreshtha | ...... | H04L 41/0631 |
| 10,904,289 B2 | 1/2021 | Tsironis | | |
| 10,958,674 B2 | 3/2021 | Tsironis | | |
| 11,032,307 B2 | 6/2021 | Tsironis | | |
| 11,100,064 B2* | 8/2021 | Dwarampudi | ......... | G06N 5/022 |
| 11,323,464 B2 | 5/2022 | Jakobsson | | |
| 11,750,607 B2* | 9/2023 | Yedidi | ................. | H04L 63/0884 726/7 |
| 11,782,891 B2* | 10/2023 | Dwarampudi | ......... | G06N 5/022 707/695 |

(Continued)

FOREIGN PATENT DOCUMENTS

WO 2001010082 A2 2/2001
WO 2021170249 A1 9/2021

*Primary Examiner* — Moustafa M Meky
(74) *Attorney, Agent, or Firm* — Erik Swanson; Hunter E. Webb; Keohane & D'Alessandro, PLLC

(57) ABSTRACT

Disclosed embodiments provide techniques for log file manipulation detection. Log file terms are identified in a set of known good log files. A frequency metric is computed for the log file terms, and one or more clusters are formed that represent the terms and their corresponding frequency metric values within the set of known good log files. New log files are then obtained from an operational computer system. The frequency metric for those terms in the new log files are computed, and checked against the established clusters. A score is computed based on how similar the new log files are to the set of known good log files by comparing the frequency metric for terms in the new log file to the data in the previously obtained cluster(s). In response to a score exceeding a predetermined threshold, one or more mitigation actions are taken.

20 Claims, 9 Drawing Sheets

(56) References Cited

U.S. PATENT DOCUMENTS

| | | |
|---|---|---|
| 2014/0096249 A1 | 4/2014 | Dupont et al. |
| 2019/0095313 A1 | 3/2019 | Xu et al. |
| 2019/0104118 A1 | 4/2019 | Wu et al. |
| 2020/0067861 A1 | 2/2020 | Leddy et al. |
| 2020/0349133 A1* | 11/2020 | Dwarampudi ...... G06F 16/2358 |
| 2021/0081441 A1 | 3/2021 | Kaushik et al. |
| 2021/0191798 A1* | 6/2021 | Zhang ................. G06F 11/3476 |
| 2022/0043791 A1* | 2/2022 | Dwarampudi .......... G06F 8/656 |
| 2022/0255926 A1 | 8/2022 | Crabtree et al. |
| 2023/0135368 A1* | 5/2023 | Srivastava .......... G06F 16/1805 |
| | | 707/822 |

* cited by examiner

LOGINFO 172.121.143.32 - - [18/Mar/2023:08:04:22 +0200] "GET /images/logo.jpg HTTP/1.1" 200 512 "http://www.myfavoriteurl.xyz/" "Mozilla/5.0 (X11; U; Linux i686; de-DE; rv:1.7.5)"

LOGINFO 10.185.248.71 - - [18/Mar/2023:19:12:06 +0000] 808840 "GET /inventoryService/inventory/purchaseItem?userId=20253471&itemId=23434300 HTTP/1.1" 500 17 "-" "Apache-HttpClient/4.2.6 (java 1.5)"

LOGTRACE1 192.0.2.11 - - [18/Mar/2023:16:10:20 +0000] "POST /index.htm HTTP/1.1" 404 196 "-" "Mozilla/5.0 (Windows NT 10.0; WOW64) AppleWebKit/537.36 (KHTML, like Gecko) Chrome/72.0.3626.121 Safari/537.36"

LOGTRACE2 192.0.2.11 - - [18/Mar/2023:16:10:20 +0000] "POST /FD873AC4-CF86-4FED-84EC-4BD59C6F17A7 HTTP/1.1" 404 196 "-" "Mozilla/4.0 (compatible; MSIE 6.0; Windows NT 5.1)"

LOGINFO 192.0.2.11 - - [18/Mar/2023:16:45:22 +0000] "POST /boaform/admin/formLogin HTTP/1.1" 404 196 "http://68.183.24.124:80/admin/login.asp" "Mozilla/5.0 (X11; Ubuntu; Linux x86_64; rv:71.0) Gecko/20100101 Firefox/71.0"

LOGDEBUG 192.0.2.12 - - [18/Mar/2023:17:09:18 +0000] "GET / HTTP/1.1" 403 7620 "-" "Linux Gnu (cow)"

LOGWARN 192.0.2.12 - - [18/Mar/2023:17:09:18 +0000] "GET / HTTP/1.1" "404 - Not Found"

LOGERROR 192.168.86.53 - - [18/Mar/2023:17:09:18 +0000] "GET / HTTP/1.1" "460 - Connection Closed Unexpectedly"

FIG.5

```
LOGINFO 172.121.143.32 - - [18/Mar/2023:08:04:22 +0200] "GET /images/logo.jpg HTTP/1.1" 200 512
"http://www.myfavoriteurl.xyz/" "Mozilla/5.0 (X11; U; Linux i686; de-DE;rv:1.7.5)"

LOGINFO 10.185.248.71 - - [18/Mar/2023:19:12:06 +0000] 808840 "GET
/inventoryService/inventory/purchaseItem?userId=20253471&itemId=23434300 HTTP/1.1" 500 17 "-"
"Apache-HttpClient/4.2.6 (java 1.5)"

LOGTRACE1 192.0.2.11 - - [18/Mar/2023:16:10:20 +0000] "POST /index.htm HTTP/1.1" 404 196 "-"
"Mozilla/5.0 (Windows NT 10.0; WOW64) AppleWebKit/537.36 (KHTML, like Gecko) Chrome/72.0.3626.121
Safari/537.36"
     ⌐624                              ⌐637
LOGTRACE2 ********** - - [18/Mar/2023:16:10:20 +0000] "POST /FD873AC4-CF86-4FED-84EC-4BD59C6F17A7
HTTP/1.1" 404 196 "-" "Mozilla/4.0 (compatible; MSIE 6.0; Windows NT 5.1)"

LOGINFO 192.0.2.11 - - [18/Mar/2023:16:45:22 +0000] "POST /boaform/admin/formLogin HTTP/1.1" 404 196
"http://68.183.24.124:80/admin/login.asp" "Mozilla/5.0 (X11; Ubuntu; Linux x86_64; rv:71.0)
Gecko/20100101 Firefox/71.0"

LOGINFO 192.0.2.12 - - [18/Mar/2023:17:09:18 +0000] "GET / HTTP/1.1" 403 7620 "-" "Linux Gnu (cow)"

LOGWARN 192.0.2.12 - - [18/Mar/2023:17:09:18 +0000] "GET / HTTP/1.1" "404 - Not Found"

LOGERROR 192.168.86.53 - - [18/Mar/2023:17:09:18 +0000] "GET / HTTP/1.1" "460 - Connection Closed
Unexpectedly"
```

FIG.6

LOG FILE MANIPULATION DETECTION

FIELD

The present invention relates generally to computer systems, and more particularly, to log file manipulation detection.

BACKGROUND

Log files are used in computer systems to record events, errors, and other important information related to the operation of the system or specific applications. Modern computing systems and applications generate vast amounts of log files resulting from the operation of those computing systems and applications. In some cases, gigabytes of diagnostic output, in the form of various log files, may be generated.

Enterprise and cloud-based systems are examples of large-scale systems that include a large set of components and software. As technology continues to advance, these computing systems become increasingly complicated in their internal structure and in their interconnections with other computing systems. Such systems can have multiple components that rely on other components for information and/or access to resources. As a result, log files and analysis of log file contents have taken on increasing importance in recent years. Log files have applications including debugging and troubleshooting, performance analysis, cybersecurity, and more. Thus, log files are an important tool for system administrators and developers to monitor and maintain the health of a computer system.

SUMMARY

Embodiments can include a computer-implemented method, comprising: identifying a plurality of terms within a corpus of log files from a computer system; computing a frequency metric for each of the plurality of terms; creating a cluster, wherein the cluster includes a tuple for each term of the plurality of terms; computing a score based on a difference between the frequency metrics in the cluster and corresponding frequency metrics in a new log file; and executing at least one action in response to the score exceeding a predetermined threshold.

Additional embodiments can include an electronic computation device comprising: a processor; a memory coupled to the processor, the memory containing instructions, that when executed by the processor, cause the electronic computation device to: identify a plurality of terms within a corpus of log files from a computer system; compute a frequency metric for each of the plurality of terms; create a cluster, wherein the cluster includes a tuple for each term of the plurality of terms; compute a score based on a difference between the frequency metrics in the cluster and corresponding frequency metrics in a new log file; and execute at least one action in response to the score exceeding a predetermined threshold.

Other embodiments can include a computer program product for an electronic computation device comprising a computer readable storage medium having program instructions embodied therewith, the program instructions executable by a processor to cause the electronic computation device to: identify a plurality of terms within a corpus of log files from a computer system; compute a frequency metric for each of the plurality of terms; create a cluster, wherein the cluster includes a tuple for each term of the plurality of terms; compute a score based on a difference between the frequency metrics in the cluster and corresponding frequency metrics in a new log file; and execute at least one action in response to the score exceeding a predetermined threshold.

BRIEF DESCRIPTION OF THE DRAWINGS

FIG. 5 is an exemplary log file processed by embodiments of the present invention.

FIG. 6 is an exemplary manipulated log file.

Figure 1:
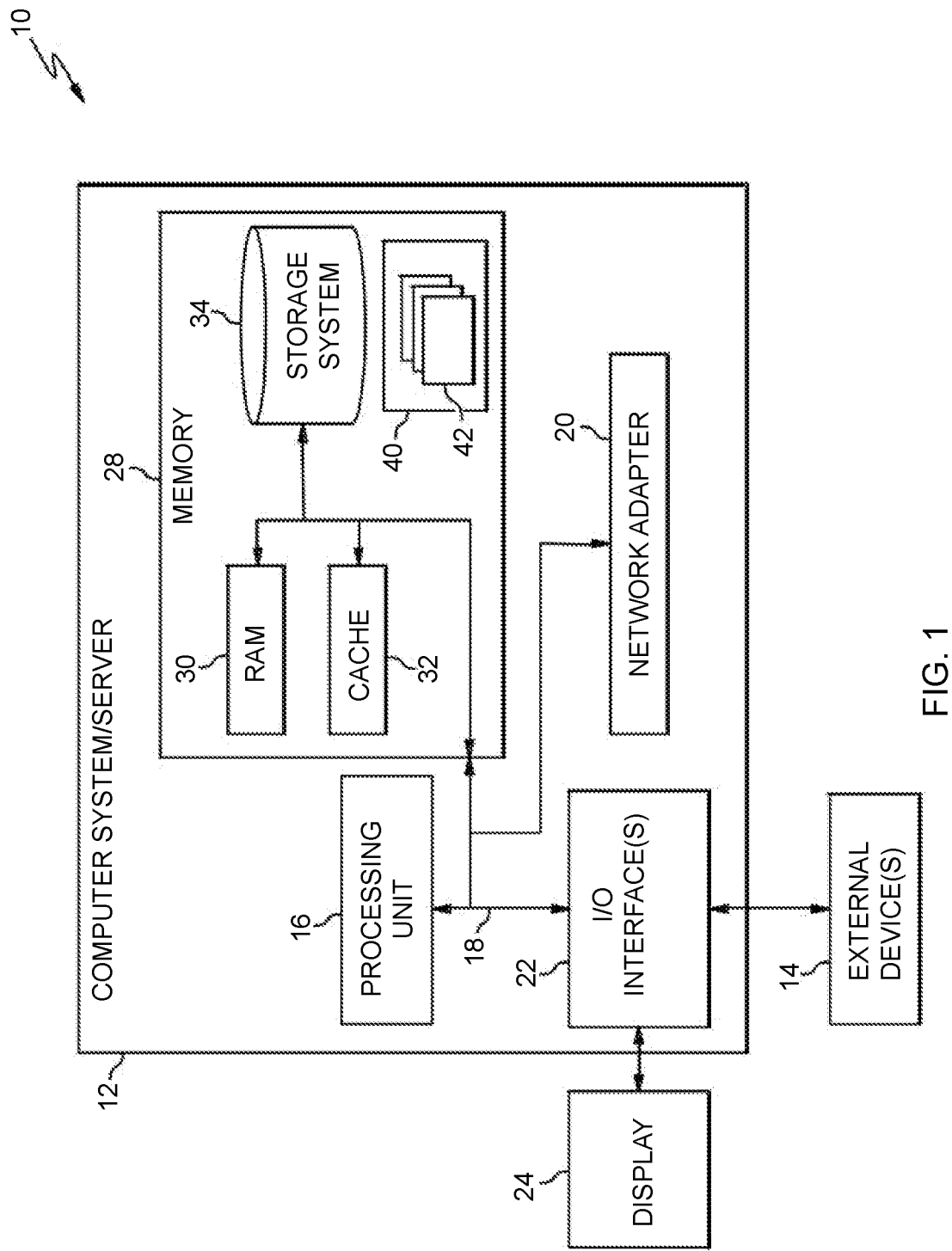
FIG. 1 depicts a cloud computing node according to an embodiment of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

One of the most important uses of log files is for cybersecurity applications. This is of particular importance for large-scale enterprise systems that may serve millions of people. Cybersecurity is of utmost importance in enterprise systems. Enterprise systems often store sensitive data such as customer information, financial data, and proprietary information. A breach in security can result in the loss or theft of this data, which can have a serious impact on the business and its reputation. Additionally, a cybersecurity breach can also result in financial loss for the business. This can include costs associated with recovery from the breach, damage to the company's reputation, and potential legal fees or fines. Another important factor is availability. A cybersecurity breach can also result in system downtime, which can disrupt business operations and result in lost productivity and revenue. Therefore, a strong cybersecurity strategy is essential for protecting sensitive data, preventing financial loss, and preventing downtime, among other important functions and benefits.

Log files can help to detect and investigate security breaches. They can be used to monitor system activity and detect unauthorized access attempts, as well as record information about user behavior. The use of logs in cybersecurity is well known to malicious actors ("hackers"). Once a system is infiltrated, the malicious actors may try to delete or otherwise manipulate log files by altering their contents in order to help hide their activities. Therefore, early detection of log file manipulation is an important component of an effective cybersecurity strategy.

Disclosed embodiments provide techniques for log file manipulation detection. Log file terms are identified in a set of known good log files. A frequency metric is computed for the log file terms, and one or more clusters are formed that represent the terms and their corresponding frequency metric values within the set of known good log files. New log files are then obtained from an operational computer system. The frequency metric for those terms in the new log files are computed and checked against the established clusters. A score is computed based on how similar the new log files are to the set of known good log files by comparing the frequency metric for terms in the new log file to the data in the previously obtained cluster(s). In response to a score exceeding a predetermined threshold, one or more mitigation actions are taken. The mitigation actions can include, but are not limited to, alerting stakeholders, disabling the computer system, setting the computer system in a lockdown mode, and/or other mitigation actions. In this way, the technical field of computer security is improved.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

Computer system/server 12 typically includes a variety of computer system readable media. Such media may be any available media that is accessible by computer system/server 12, and it includes both volatile and non-volatile media, removable and non-removable media.

Program/utility 40, having a set (at least one) of program modules 42, may be stored in memory 28 by way of example (which can include cache 32, RAM 30, and storage system 34), and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
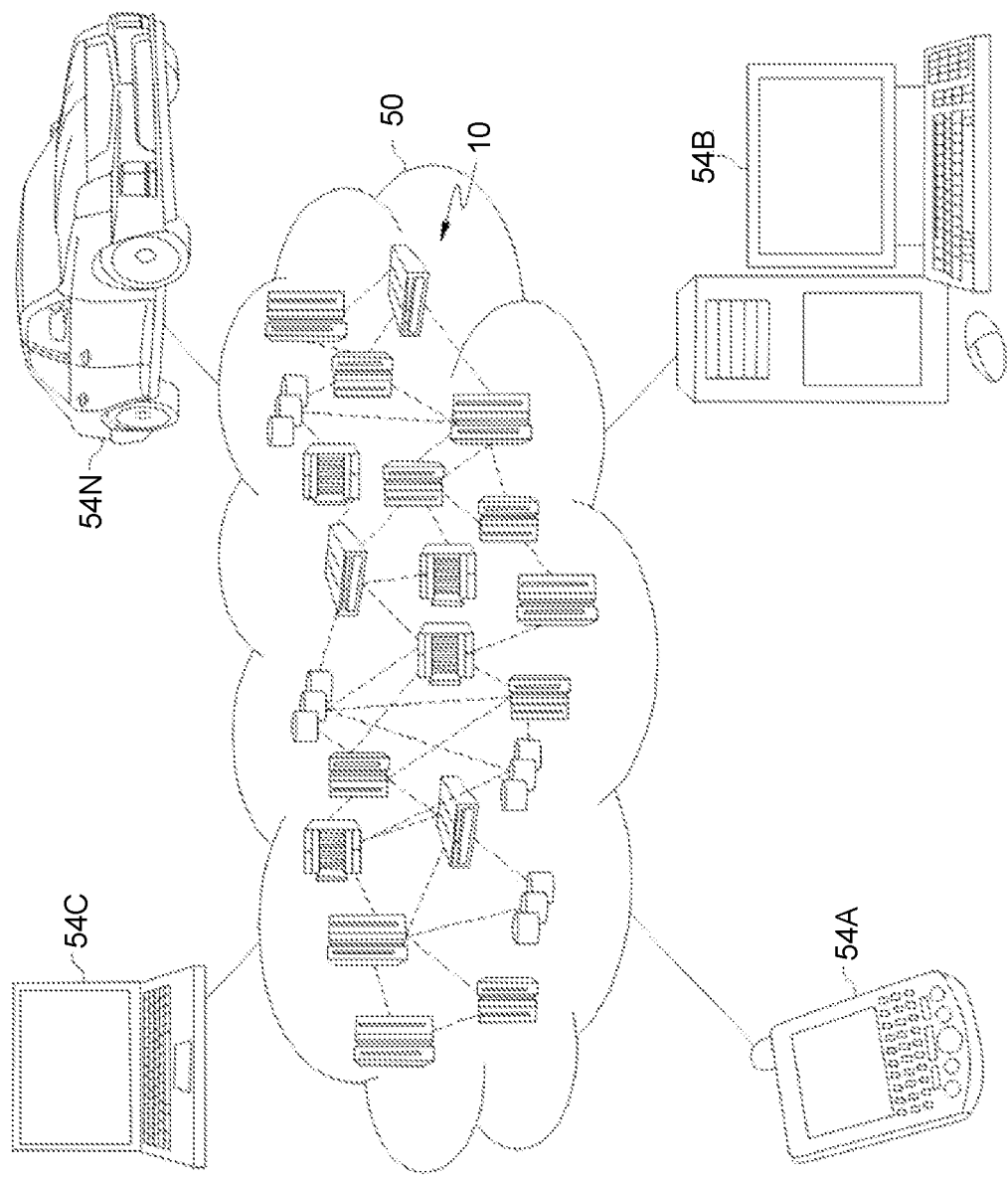
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
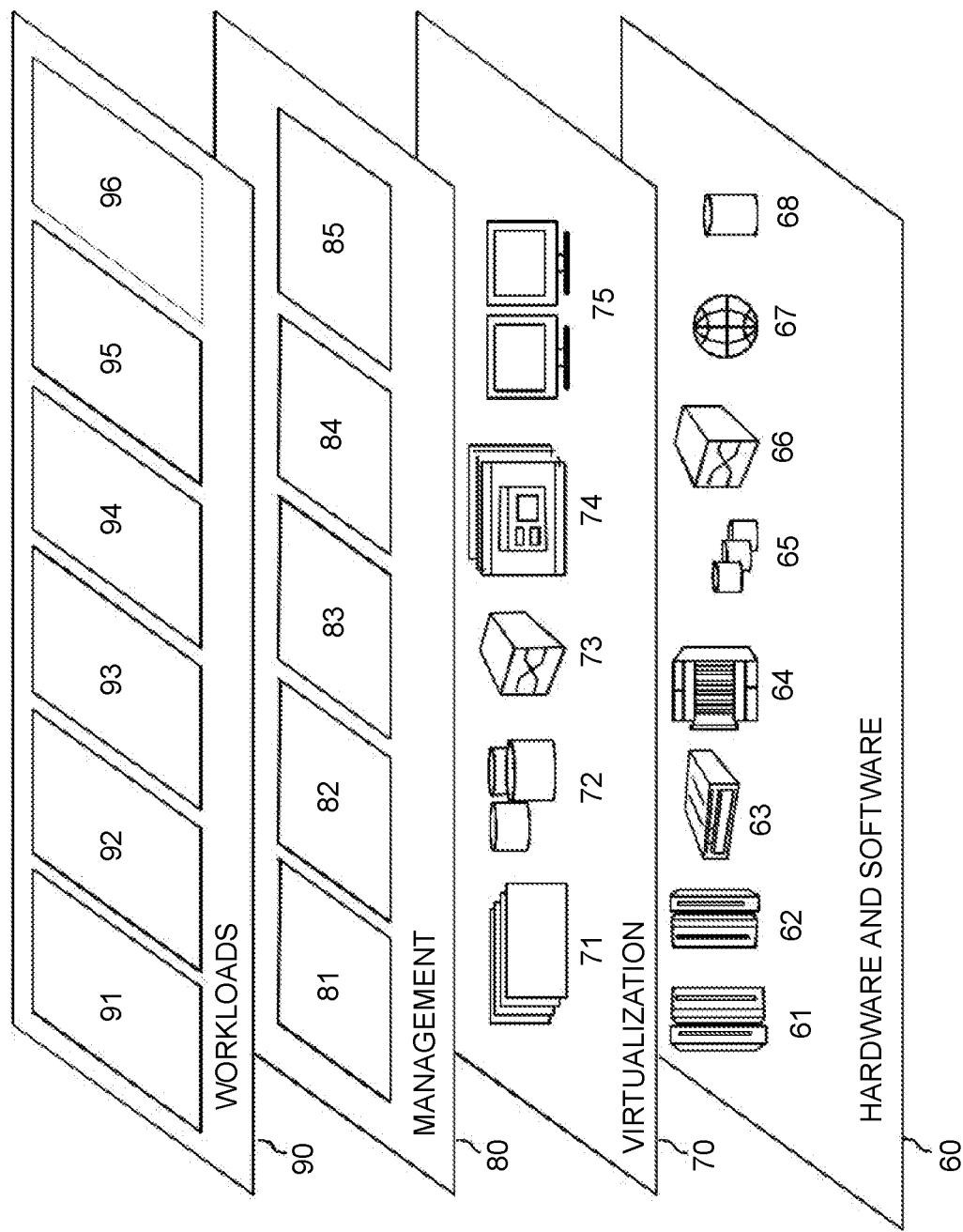
FIG. 3 depicts abstraction model layers according to an embodiment of the present invention.

Referring now to FIG. 3, a set of functional abstraction layers provided by cloud computing environment 50 (FIG.

2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and log file manipulation detection system 96.

Implementations of the invention may include a computer system/server 12 of FIG. 1 in which one or more of the program modules 42 are configured to perform (or cause the computer system/server 12 to perform) one or more functions of the log file manipulation detection system 96 of FIG. 3. For example, the one or more of the program modules 42 may be configured to: identify a plurality of terms within a corpus of log files from a computer system; compute a frequency metric for each of the plurality of terms; create a cluster, wherein the cluster includes a tuple for each term of the plurality of terms; obtain a new log file; identify the plurality of terms in the new log file; compute the frequency metric for each term of the plurality of terms in the new log file; compute a score based on a difference between the frequency metrics in the cluster and the corresponding frequency metrics in the new log file; and execute at least one action in response to the score exceeding a predetermined threshold.

Figure 4:
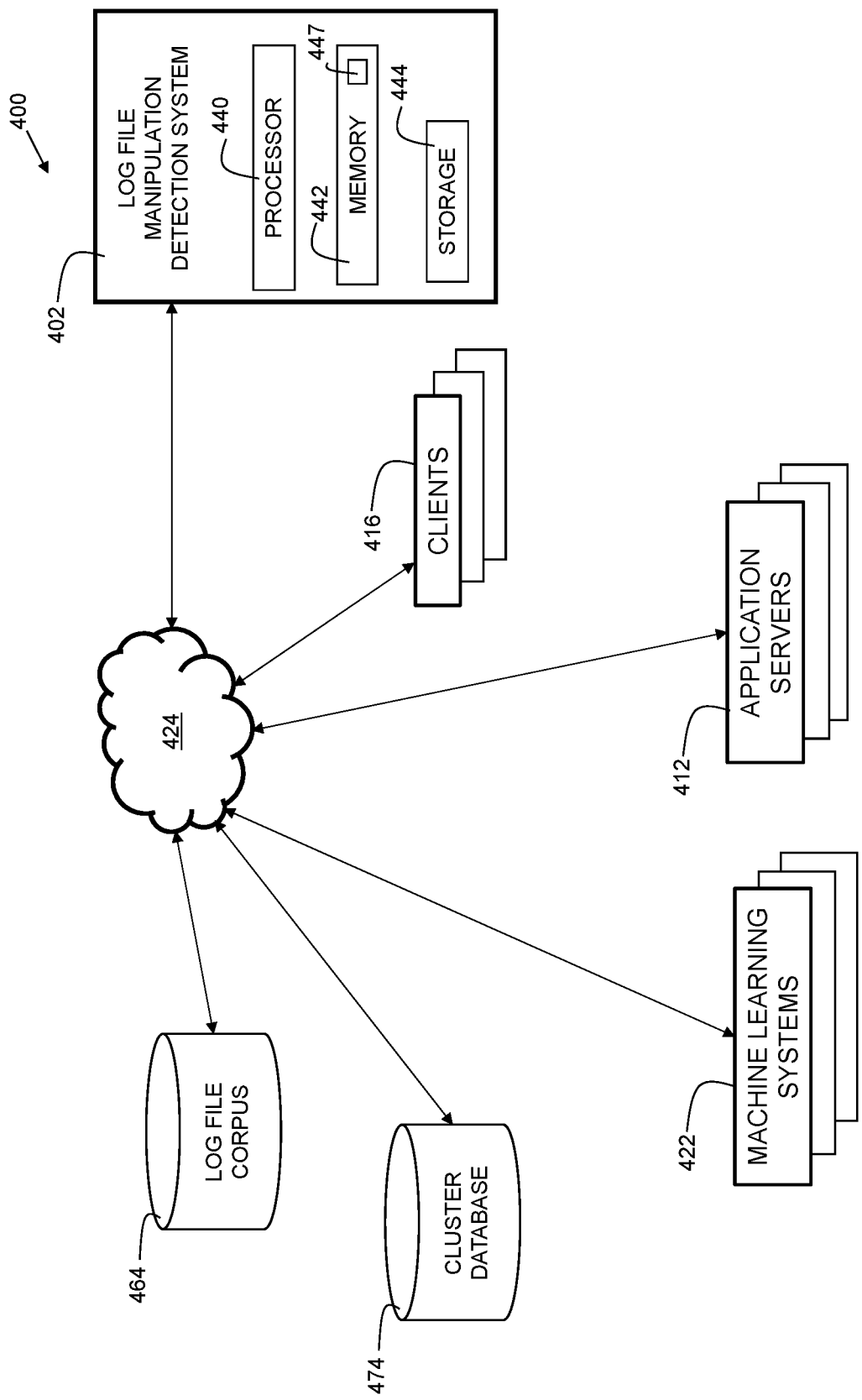
FIG. 4 is an ecosystem for embodiments of the present invention.

FIG. 4 is an ecosystem 400 for embodiments of the present invention. Log File Manipulation Detection System (LFMDS) 402 comprises a processor 440, a memory 442 coupled to the processor 440, and storage 444. LFMDS 402 is an electronic computation device. The memory 442 contains program instructions 447, that when executed by the processor 440, perform processes, techniques, and implementations of disclosed embodiments. Memory 442 can include dynamic random-access memory (DRAM), static random-access memory (SRAM), magnetic storage, and/or a read only memory such as flash, EEPROM, optical storage, or other suitable memory, and should not be construed as being a transitory signal per se. In some embodiments, storage 444 may include one or more magnetic storage devices such as hard disk drives (HDDs). Storage 444 may additionally include one or more solid state drives (SSDs). The LFMDS 402 is configured to interact with other elements of ecosystem 400. LFMDS 402 is connected to network 424, which can include the Internet, a wide area network, a local area network, and/or other suitable network.

Ecosystem 400 may include one or more client devices, indicated as 416. Client device 416 can include a laptop computer, desktop computer, tablet computer, smartphone, or other suitable computing device. Client device 416 may be used to receive information from, and/or configure LFMDS 402.

Ecosystem 400 may include one or more application servers 412. The application servers 412 may implement HTML-based user interfaces and provide backend functionality to support enterprise-level applications, including gaming, virtual meetings, education, e-commerce, banking, and/or financial applications, to name a few. The application servers 412 may be configured to generate log files during their operation that can be stored in log file corpus 464, which is a repository of log files from one or more applications. In embodiments, the log files from the application servers 412 are analyzed by the log file manipulation detection system 402 to detect possible unauthorized log file manipulation and automatically take actions such as issuing alerts and/or lockdown or shutdown of one or more of the application servers 412. Ecosystem 400 may include one or more machine learning systems 422. The machine learning systems 422 can include, but are not limited to, a convolutional neural network (CNN), Recurrent Neural Network (RNN), Long Short Term Memory Network (LSTM), Radial Basis Function Network (RBFN), Multilayer Perceptron (MLP), Gradient Boosted Network, and/or other suitable neural network types. In some embodiments, the LFMDS 402 may orchestrate training and inputting data and receiving of output data from the machine learning systems 422. In some embodiments, one or more of the aforementioned neural networks may be used to perform supplemental analysis on log files in log file corpus 464. The supplemental analysis can include, but is not limited to, performing natural language processing to identify terms within the log files that are to be used for similarity comparisons.

Ecosystem 400 may further include cluster database 474. The cluster database can include an SQL database, or other suitable database type. The cluster database can include storage of one or more clusters. Each cluster can include one or more terms from log files, and a corresponding frequency metric. The frequency metric, along with the log file term, forms a tuple. In embodiments, each cluster includes a collection of tuples. The clusters are used by the LFMDS 402 to compute a similarity score of new log files generated by application servers 412. In embodiment, upon detecting a similarity score that is outside of a predetermined range, one or more actions are performed, including sending alert messages to one or more client devices 416, and/or lockdown or shutdown of one or more of the application servers 412.

FIG. 5 is an exemplary log file 500 processed by embodiments of the present invention. Log file 500 includes eight log lines, indicated by reference numbers 551-558. Logs can include various logging levels, for errors, warnings, information, as well as debug and/or trace information. In some embodiments, log files may rotate (start a new log) at a predetermined time schedule, such as hourly or daily. In some embodiments, log files may rotate based on a predetermined file size (e.g., 500 KB). Regardless of the log rotation criteria used, disclosed embodiments can analyze the log files to check for possible unauthorized manipulation.

In line 551, at 502, a logging level field of LOGINFO. At 504, an internet protocol (IP) address is shown. At 508, a command is shown. At 510, a destination is shown. In embodiments, the destination can be a domain, IP address, or other suitable destination indicator. At 512, an application name is shown. In embodiments, the fields used for establishing clusters can include a logging level, application name, source address, destination address, command, and/or application name.

In line 553 at 522, a logging level of LOGTRACE1 is shown. Similarly, in line 554, at 524, a logging level of LOGTRACE2 is shown. In some embodiments, using a wildcard operator, both LOGTRACE1 and LOGTRACE2 may be used as terms. In embodiments, a configuration can include a term such as LOGTRACE? where the question mark '?' serves as a wildcard operator to include the term LOGTRACE1 and LOGTRACE2 as terms for log file analysis. In line 554 at 537 there is a source IP address of 192.0.2.11. Lines 556, 557, and 558 show examples of additional logging levels. In line 556 at 526 is a logging level of LOGDEBUG. In line 557 at 528 is a logging level of LOGWARN. In line 558 at 529 is a logging level of LOGERROR. The logging levels used are application-dependent, and can vary from those shown in FIG. 5.

In some embodiments, a numeric template may be used to identify terms. As an example, a numeric template of the form 1:3:N'.' 1:3:N'.' 1:3:N'.' 1:3:N may be used to indicate that a pattern of 1 to 3 numerical digits, followed by a period, followed by another pattern of 1 to 3 numerical digits, followed by a period, followed by another pattern of 1 to 3 numerical digits, followed by a period, followed by another pattern of 1 to 3 numerical digits, represents an IPv4 address that can have the form nnn.nnn.nnn.nnn. However, in many cases, less than three digits are shown in each section of an IPv4 address. Thus, the numerical template can recognize an address such as 192.168.100.100, where each section includes three digits, as well as recognizing an address such as 10.0.0.123, where some sections have less than three digits. In embodiments, the numerical template can be a term that is used for computing the frequency metric. That is, there can be many different IPv4 addresses in log files, so in some embodiments, the addresses are checked to see if they fit the numeric template, and are treated as an occurrence of the numeric template for the purposes of computing a frequency metric. This can be useful for data that frequently changes, such as IP addresses and/or timestamps. That is, while the exact string of an IP address or a given timestamp may occur only once within a log file, the general format of such fields is consistent, and thus, by using template substitution, where a template such as 1:3: N'.' 1:3:N'.' 1:3:N'.' 1:3:N is used to compute a term rather than the actual IPv4 address, disclosed embodiments can make use of frequency metrics for analysis of text computer log files. Thus, in embodiments, the plurality of terms includes a template, based on template substitution. While the aforementioned example described a template for an IPv4 address, a similar template can be used for an IPv6 address, date field, and/or other suitable fields.

There is a wide variety of information that applications can generate in log files, and the information shown in FIG. 5 is merely an example, and disclosed embodiments can operate with a variety of known logging formats. These can include, but are not limited to:

CSV (Comma Separated Value) format: CSV is a simple and widely used format that can be used for a variety of log files. CSV log files typically include data in column format, with each column separated by a comma.

Syslog: Syslog is a standard protocol for logging system messages. Syslog messages can be formatted in various ways, and contain a variety of fields, that often include a timestamp, hostname, application name, and a message describing the event and/or error.

Apache log format: Apache is a popular web server software, and its log files typically use a specific format. The Apache log format includes information such as the client's IP address, the date and time of the request, the request method, the requested URL, and the HTTP status code.

Windows Event Log: Windows operating systems use the Windows Event Log to record system events, errors, and warnings. The Windows Event Log format can include information such as the date and time of the event, the source of the event, and a message describing the event or error.

Common Log Format (CLF): The Common Log Format is a standard format used by many web servers. It can include information such as the client's IP address, the date and time of the request, the requested URL, the HTTP status code, and the size of the response in bytes.

JSON (JavaScript Object Notation) format: JSON is a lightweight data interchange format that is commonly used for structured logging. JSON log files can be parsed and used with a wide range of programming languages and tools.

Other logging formats now known, or hereinafter developed may be used with disclosed embodiments.

FIG. 6 is an exemplary manipulated log file 600. Log file 600 is similar to log file 500 of FIG. 5, with the exception of line 654. In line 654, at 624, is a logging level of LOGTRACE2, similar to 524 in line 554 of FIG. 5. However, in line 654 at 637, the source IP address has been replaced with asterisks, thus removing potentially important information from a log file. Malicious actors, such as hackers or cybercriminals could attempt such actions if they gain unauthorized access to a computer system. The rationale is that by minimally manipulating a log file, the malicious actors may attempt to maintain the approximate file size and overall contents that administrators are expecting, in an effort to hide the manipulation of the log file. However, with disclosed embodiments, the term at 637, instead of being of the form of an IP address, is showing as a string of asterisks. The pattern of asterisks does not fit into the numeric template of 1:3:N'.' 1:3:N'.' 1:3:N'.' 1:3:N previously described, and thus is treated as a different term that does not occur in the same frequency as valid IP addresses in the training log files, and thus, the pattern of asterisks can be quickly identified and appropriate stakeholders can be alerted to minimize the damage caused by the malicious actors.

Line 654 in log file 600 is an example of an incongruent log segment. The incongruent log segment contains terms that do not occur in a similar frequency in the known good log files. By checking the similarity of the term including the asterisks against previously established clusters that are based on known good log files, the manipulation can be detected, and automatic mitigation actions can be performed. The automatic mitigation actions can include, but are not limited to, issuing alerts and/or lockdown or shutdown of one or more computer systems.

Figure 7:
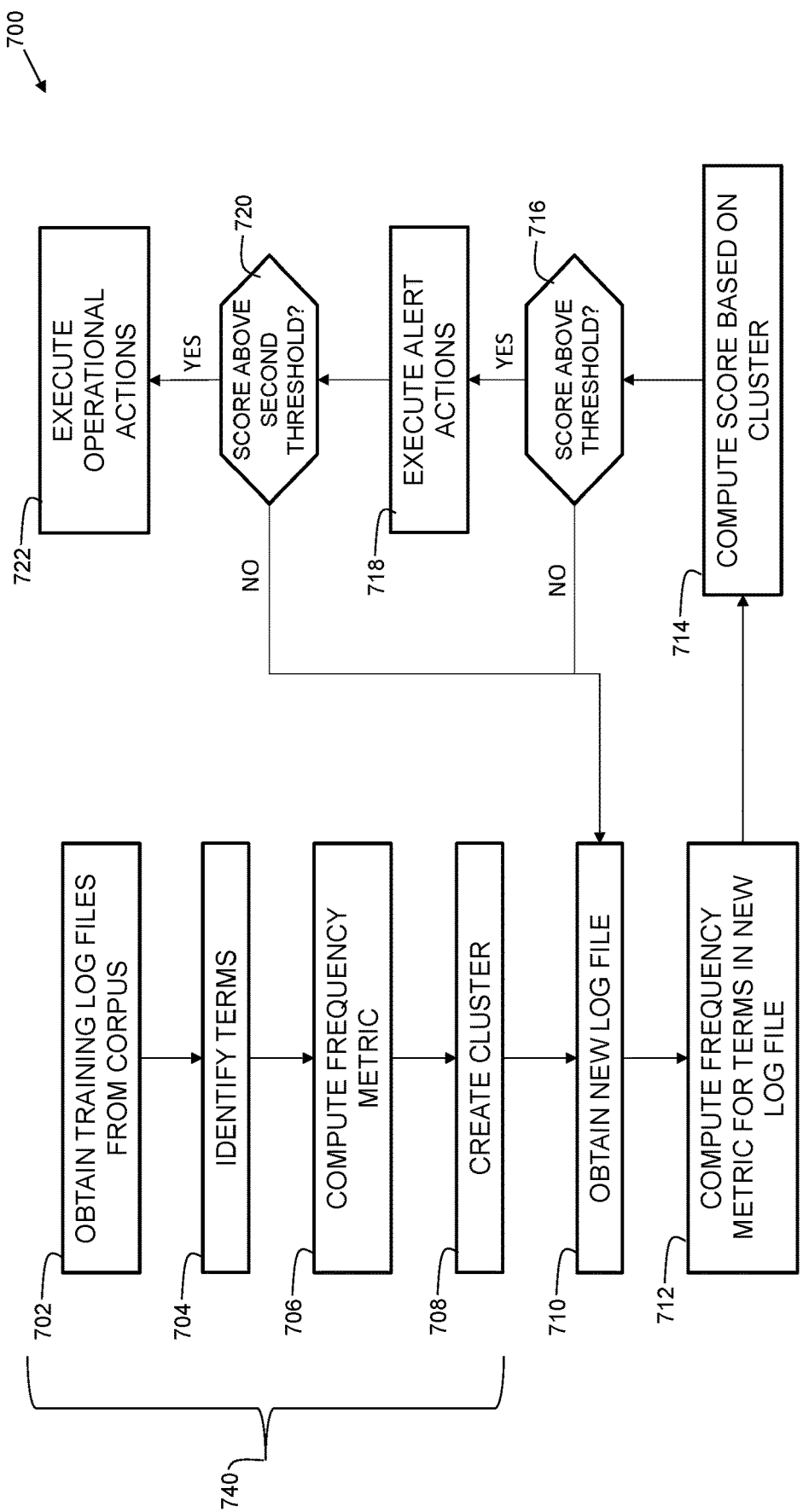
FIG. 7 is a flowchart indicating process steps for embodiments of the present invention.

FIG. 7 is a flowchart 700 indicating process steps for embodiments of the present invention. At 702, training log files from a corpus are obtained. The training log files can be log files from previous execution of a computer system. The training log files can be 'known good' log files from normal/proper operation. At 704, terms are identified in the training log files. In some embodiments, the terms can be based on delimiters in the log files. For example, fields can be delimited by tabs, commas, spaces, and/or other characters or sequences of characters. In embodiments, the identified terms can include, but are not limited to, an internet protocol (IP) address, a logging level, and/or an application name. The IP address can include an ipv4 address and/or an ipv6address. Other identifiers can include, but are not limited to, a MAC address, a UDP port number, a socket number, a debug zone, a timestamp, and/or other suitable identifiers.

At 706, a frequency metric is computed. The frequency metric can be a measure of how relevant/important/unique a given term is within a document. In embodiments, the frequency metric includes term frequency-inverse document frequency (TF-IDF). TF-IDF stands for Term Frequency-Inverse Document Frequency. It is a numerical statistic that reflects the importance of a word or phrase in a document or a collection of documents. The TF-IDF score is calculated by multiplying two factors: the term frequency (TF) and the inverse document frequency (IDF).

Term frequency (TF) is a measure of how frequently a word or phrase appears in a document. It is calculated as the number of times a term appears in a document divided by the total number of terms in the document. Therefore, TF provides an indication of how important a word or phrase is in a document. Inverse document frequency (IDF) is a measure of how unique a word or phrase is across a collection of documents. It is calculated as the logarithm of the total number of documents in the collection divided by the number of documents that contain the term. IDF provides an indication of how common or rare a word or phrase is in the collection of documents.

The TF-IDF score is the product of TF and IDF. The higher the TF-IDF score of a word or phrase in a document, the more important or relevant it is to that document. Thus, a high TF-IDF score indicates that a word or phrase is both frequent in the document and unique across the collection of documents. Thus, TF-IDF is a frequency metric that reflects the importance of a word or phrase in a document or a collection of documents. In disclosed embodiments, the documents can be text-based log files generated by a computer system. The TF-IDF can be used to assess the similarity of a log file to a collection of previously analyzed log files. Disclosed embodiments detect a reduction in similarity, and treat it as potentially suspicious activity, which results in one or more mitigation actions being executed. The mitigation actions can include sending alerts to remote computing devices about potentially suspicious activity, and/or additional actions such as pausing, or locking down the computer system that generated the log file.

In some embodiments, the frequency metric includes a Jaccard Index value. The Jaccard Index, also known as the Jaccard Similarity Coefficient, is a measure of similarity between two sets of data. It is used to determine the extent to which the two sets overlap, and is calculated as the ratio of the size of the intersection of the sets to the size of the union of the sets. In disclosed embodiments, the Jaccard Index is expressed as a value between 0 and 1, with higher values indicating greater similarity. The Jaccard Index can be used to compare two sets of words or phrases, and can be used to identify similarities and differences in text data. Disclosed embodiment can apply the Jaccard Index to computer log files for cybersecurity purposes. Other frequency metrics are possible in disclosed embodiments.

At 708, a cluster is created. The cluster can include a data structure that contains a collection of tuples, where each tuple includes a term identified at 704, along with its corresponding frequency metric computed at 706. In some embodiments, multiple clusters may be created, where each cluster includes a subset of the terms identified at 704. The steps 702-708 collectively form training sequence 740 which is performed prior to using disclosed embodiments to analyze log files during operation of the computer system.

At 710, a new log file is obtained. The new log file is a log file from a computer system which is analyzed to assess if the terms in the new log file are congruent with those included in the training log files. At 714, a score is computed based on the cluster. Computing the score can include computing an absolute value of the difference between the frequency metric of each term in the new log file and the frequency metric of the corresponding terms in the cluster. In embodiments, for terms that do not appear in a cluster, the frequency metric can be treated as zero in the cluster for those terms, for the purposes of computing the difference. In embodiments, the sum of the differences is computed as the score. At 716, a check is made to determine if the score computed at 714 is above a predetermined threshold. If no at 716, the process returns to 710 to continue monitoring new log files. If yes at 716, then the process continues to 718, where at least one alert action is executed. The alert actions can include sending an alert message to a remote computing device. The remote computing device can be a smartphone, tablet computer, wearable computer, and/or other suitable computing device. The alert message can include additional information about the suspicious log file, including rendering an incongruent log segment.

In some embodiments, multiple thresholds may be established. In embodiments, a first threshold being exceeded may trigger warnings/notifications, and a second threshold being exceeded may trigger additional actions. At 720, a check is made to determine if the score exceeds a second threshold. If no at 720, the process returns to 710 to continue monitoring new log files. If yes at 720, then the process continues to 722, where at least one additional action is executed. The additional actions can include putting the computer system in a lockdown state. In the lockdown state, user actions can be restricted. This can include automatically logging off all users, and preventing any users from logging on. In some embodiments, the action can include an automatic shutdown, such as using 'sudo shutdown-n now' or other suitable command. In this way, the amount of damage that malicious actors can do is limited, and administrators have an opportunity to assess the situation while minimizing the risk of additional damage and/or data theft by the malicious actors. In embodiments, the at least one action includes setting the computer system in a lockdown state.

Figure 8:
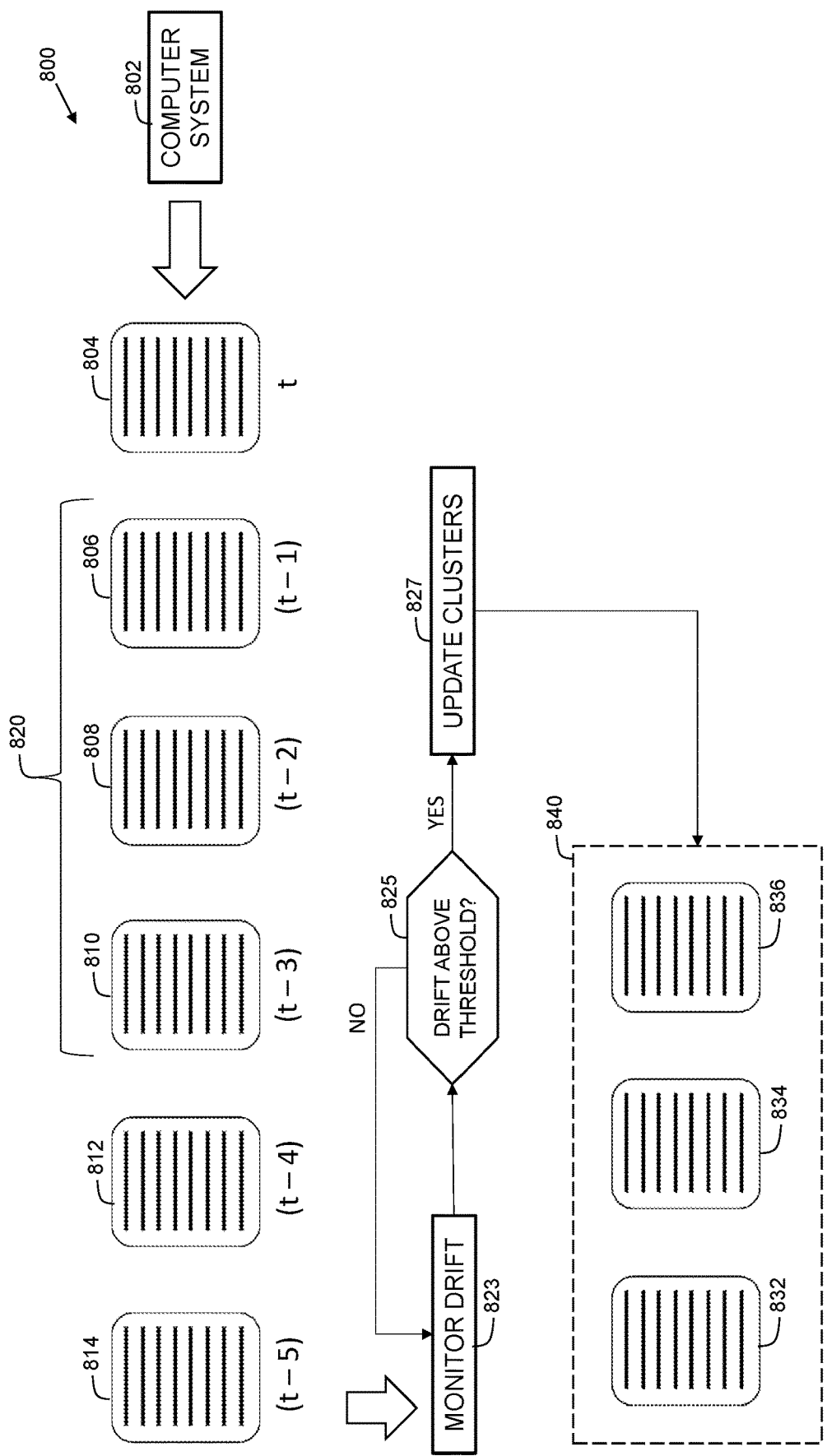
FIG. 8 is a block diagram indicating processing flow of log files in accordance with embodiments of the present invention.

FIG. 8 is a block diagram 800 indicating processing flow of log files in accordance with embodiments of the present invention. A computer system 802 generates multiple log files, indicated as 804-814. Log file 804 is the currently analyzed log file, generated at time t. Log file 806 is generated at time t-1. Log file 808 is generated at time t-2. Log file 810 is generated at time t-3. Log file 812 is generated at time t-4. Log file 814 is generated at time t-5. In embodiments, the log files can be generated at periodic intervals, such as every hour, every day, etc. In some embodiments, a new log file is generated when the existing log file reaches a size limit (e.g., 500 KB). In some embodiments, a window 820 defines a collection of previously generated log files. In embodiments, the collection of previously generated log files in window 820 (as shown in FIGS. 8, 810, 808, and 806), is compared against the training log files 832, 834, and 836, which comprise training set 840. In some situations, the log file data can drift over time. This can be due to the nature of the computer system. For example, a computer system that logs temperature data from sensors and generates freeze warning messages in a log file may have more of those messages in the winter, and they may gradually become less frequent as spring approaches. This is an example of log file drift. In disclosed embodiments, drift is monitored at 823. In embodiments, this can include the log files in the window being compared against the training set 840 using the scoring technique previously described. At 825, the drift is checked to determine if it exceeds a predetermined threshold. If no at 825, the process returns to 823 to continue monitoring for drift. If yes at 825, then the clusters are updated at 827. Thus, in embodiments, the clusters are automatically updated based on drift monitoring.

Figure 9:
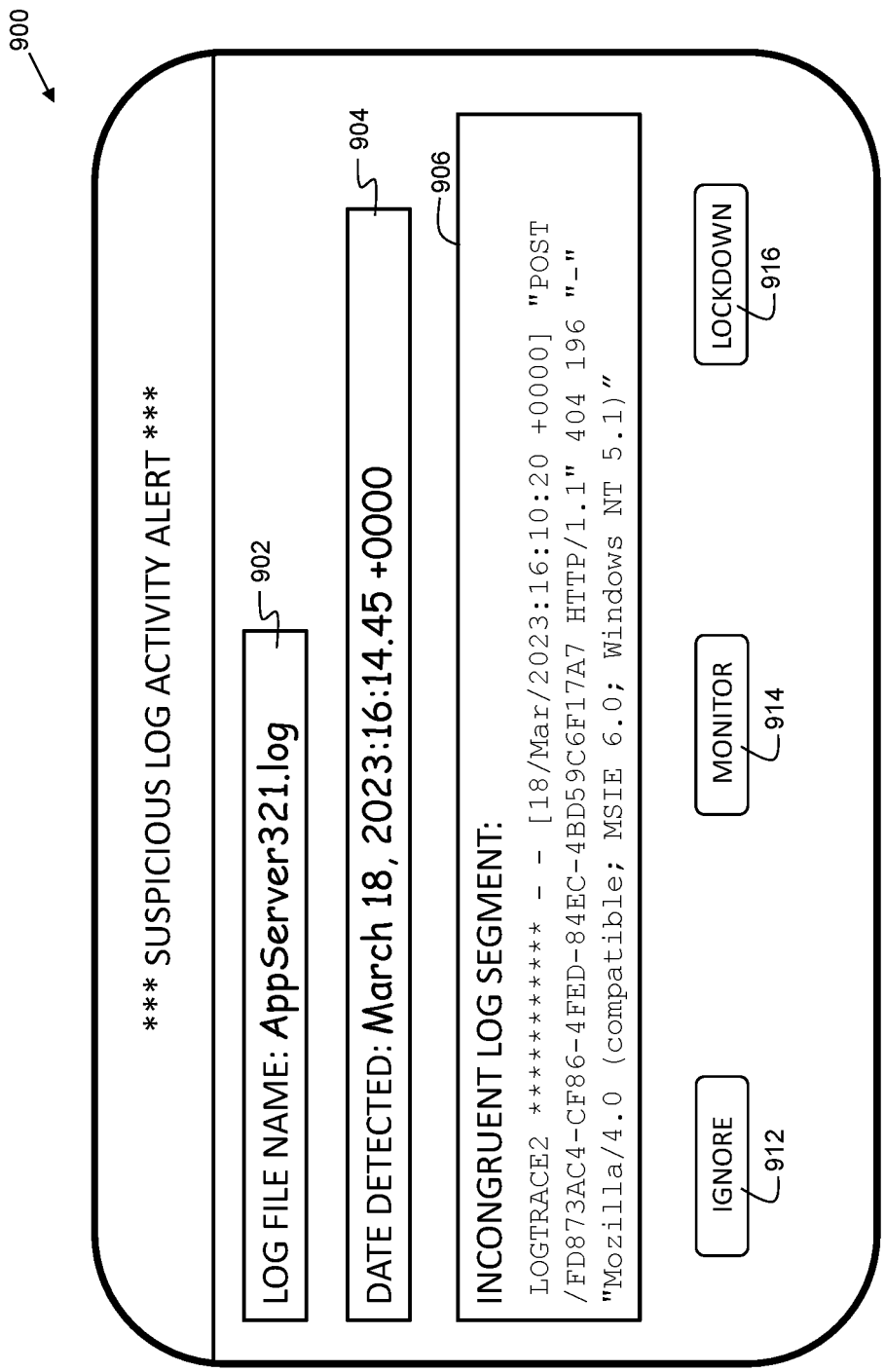
FIG. 9 is an exemplary user interface in accordance with embodiments of the present invention.

FIG. 9 is an exemplary user interface 900 in accordance with embodiments of the present invention. At 902, a log file name field is shown, indicating the name of a log file that is flagged as being potentially manipulated. At 904, a date field is shown, indicating the date the suspicious activity was detected. At 906, an incongruent log segment is shown. The incongruent log segment can include a line from the log file that triggered the suspicious log activity alert. An administrator can review the incongruent log segment. If the incongruent log segment is caused by legitimate computer system operation, the administrator can invoke the ignore button 912 to disregard the alert and suppress future alerts of this type for a predetermined time period (e.g., two hours). If the administrator is unsure, the administrator can invoke the monitor button 914, which clears the alert, but continues to show future alerts of this type. If the administrator suspects malicious activity, the administrator can invoke the lockdown button 916, which puts the computer system in a lockdown state. Embodiments can include sending an alert message to a remote computing device. Embodiments can include identifying an incongruent log segment; and including the incongruent log segment in the alert message.

Embodiments can include a computer-implemented method, comprising: identifying a plurality of terms within a corpus of log files from a computer system; computing a frequency metric for each of the plurality of terms; creating a cluster, wherein the cluster includes a tuple for each term of the plurality of terms; obtaining a new log file; identifying the plurality of terms in the new log file; computing the frequency metric for each term of the plurality of terms in the new log file; computing a score based on a difference between the frequency metrics in the cluster and the corresponding frequency metrics in the new log file; and executing at least one action in response to the score exceeding a predetermined threshold.

As can now be appreciated, disclosed embodiments provide techniques for automatic detection of potentially manipulated log files. While no single tool may be well-suited for every type of malicious attack. Disclosed embodiments provide techniques for monitoring the integrity of log files, which can be an important part of an overall cybersecurity strategy.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
identifying a plurality of terms within a corpus of log files from a computer system; computing a frequency metric for each of the plurality of terms;
creating a cluster, wherein the cluster includes a tuple for each term of the plurality of terms;
computing a score based on a difference between the frequency metrics in the cluster and corresponding frequency metrics in a new log file; and
executing at least one action in response to the score exceeding a predetermined threshold.

2. The method of claim 1, wherein the frequency metric includes term frequency-inverse document frequency (TF-IDF).

3. The method of claim 1, wherein the frequency metric includes a Jaccard Index.

4. The method of claim 1, wherein the at least one action includes sending an alert message to a remote computing device.

5. The method of claim 4, further comprising:
identifying an incongruent log segment; and
including the incongruent log segment in the alert message.

6. The method of claim 1, wherein the at least one action includes setting the computer system in a lockdown state.

7. The method of claim 1, wherein the plurality of terms includes an internet protocol (IP) address.

8. The method of claim 1, wherein the plurality of terms includes a logging level.

9. The method of claim 1, wherein the plurality of terms includes an application name.

10. The method of claim 1, further comprising:
establishing a second predetermined threshold; and
executing a second set of actions in response to the score exceeding the second predetermined threshold.

11. An electronic computation device comprising:
a processor;
a memory coupled to the processor, the memory containing instructions, that when executed by the processor, cause the electronic computation device to:
identify a plurality of terms within a corpus of log files from a computer system; compute a frequency metric for each of the plurality of terms;
create a cluster, wherein the cluster includes a tuple for each term of the plurality of terms;
compute a score based on a difference between the frequency metrics in the cluster and corresponding frequency metrics in a new log file; and
execute at least one action in response to the score exceeding a predetermined threshold.

12. The electronic computation device of claim 11, wherein the memory further comprises instructions, that when executed by the processor, cause the electronic computation device to compute a term frequency-inverse document frequency (TF-IDF) value for each of the plurality of terms.

13. The electronic computation device of claim 11, wherein the memory further comprises instructions, that when executed by the processor, cause the electronic computation device to compute a Jaccard Index value for each of the plurality of terms.

14. The electronic computation device of claim 11, wherein the memory further comprises instructions, that when executed by the processor, cause the electronic computation device to send an alert message to a remote computing device.

15. The electronic computation device of claim 14, wherein the memory further comprises instructions, that when executed by the processor, cause the electronic computation device to:

identify an incongruent log segment; and include the incongruent log segment in the alert message.

16. A computer program product for an electronic computation device comprising a computer readable storage medium having program instructions embodied therewith, the program instructions executable by a processor to cause the electronic computation device to:

identify a plurality of terms within a corpus of log files from a computer system; compute a frequency metric for each of the plurality of terms;

create a cluster, wherein the cluster includes a tuple for each term of the plurality of terms;

compute a score based on a difference between the frequency metrics in the cluster and corresponding frequency metrics in a new log file; and execute at least one action in response to the score exceeding a predetermined threshold.

17. The computer program product of claim 16, wherein the computer readable storage medium includes program instructions executable by the processor to cause the electronic computation device to compute a term frequency-inverse document frequency (TF-IDF) value for each of the plurality of terms.

18. The computer program product of claim 16, wherein the computer readable storage medium includes program instructions executable by the processor to cause the electronic computation device to compute a Jaccard Index value for each of the plurality of terms.

19. The computer program product of claim 16, wherein the computer readable storage medium includes program instructions executable by the processor to cause the electronic computation device to send an alert message to a remote computing device.

20. The computer program product of claim 19, wherein the computer readable storage medium includes program instructions executable by the processor to cause the electronic computation device to:

identify an incongruent log segment; and include the incongruent log segment in the alert message.

\* \* \* \* \*